3,276,991
ANION PERMSELECTIVE MEMBRANES AND PROCESS FOR THEIR PRODUCTION

Hiroshi Hani, 7391 Kugenuma, Fujisawa, Japan; Akira Nishihara, 62 Kuritaya Kanagawa-ku, Yokohama, Japan; and Yoshio Oda, 1 of 1 Ohmiya-cho, Kawasaki, Japan
No Drawing. Filed July 24, 1961, Ser. No. 125,959
6 Claims. (Cl. 204—296)

This invention relates to anion permselective membranes which have extremely low permeability to polyvalent anions and to a process for the production thereof.

The present invention has for its object to provide membranes which have extremely low permeability to polyvalent anions in comparison with halogen ions during electrodialysis of the solution of electrolytes containing various kinds of ions of different valence.

Many anion permselective membranes are known which consist of an insoluble infusible synthetic organic solid polymeric matrix and dissociable amine groups bonded chemically to the matrix, have a length of at least 1 cm. in two dimensions, are electrolytically conductive and are anion selectively permeable. These anion permselective membranes have a property of permeability to anions selectively but substantially not to cations. If the ion-exchange groups are primary, secondary and tertiary amines, they are called weakly basic anion-exchange resin membranes, while they are called strongly basic anion-exchange resin membranes if the ion-exchange groups are quaternary amines. The former, that is, weakly basic anion-exchange resin membranes are not suitable for use in solutions with high pH value. Accordingly, nowadays the latter, that is, anion permselective membranes consisting of strongly basic anion-exchange resins are desirable in practice.

These anion permselective membranes consisting of strongly basic anion-exchange resins generally have the property of being more permeable to monovalent anions such as Cl ion than to divalent anions such as $SO_4$ ions.

If the transport number of $SO_4$ ion and Cl ion through a membrane respectively is represented by $n_{SO_4}$ and $n_{Cl}$ and that of $SO_4$ ion and Cl ion through a solution phase is respectively represented by $t_{SO_4}$ and $t_{Cl}$, the selective permeability of $SO_4$ ion and Cl ion through an anion permselective membrane ($S_{Cl}^{SO_4}$) can be calculated by the following formula $$S_{Cl}^{SO_4} = \frac{n_{SO_4}/n_{Cl}}{t_{SO_4}/t_{Cl}}$$

If $S_{Cl}^{SO_4}$ is less than 1, the membrane is more permeable to Cl ion than to $SO_4$ ion, while if more than 1, the membrane is more permeable to $SO_4$ ion than to Cl ion.

When selective permeability of $SO_4$ ion and Cl ion is defined as mentioned above, its value in conventional anion permselective membranes consisting of strongly basic anion-exchange resins is usually less than 1 but is not extremely small. According to the result measured and found by the inventors of the present application, the selective permeability of two such membranes that are at present commercially available is 0.40 and 0.30.

To reduce this value further is very advantageous in some cases. For example, in the case where concentrated sodium chloride solution would be obtained by electrodialysis of sea water in an electrodialysis vessel in which cation permselective membrane and anion permselective membrane are placed in parallel and between them a chamber is formed, it is, of course, necessary to use cation permselective membrane through which Ca ion and Mg ion are difficultly permeable, but at the same time it is also very desirable to use anion permselective membrane through which divalent anions such as $SO_4$ ion are as difficultly permeable as possible so as to improve the purity of the resultant concentrated solution and to prevent an insoluble precipitate such as calcium sulfate from depositing on the membrane.

Thus, it is important to decrease permeability of anion permselective membranes consisting of strongly basic anion-exchange resins to divalent or higher valent ions as compared to halogen ions.

A further object of the present invention is to provide anion permselective membranes which are very suitable for the above-mentioned use.

Other objects, features and advantages of the present invention will be apparent from the following description.

This invention includes anion permselective membranes which are obtained by forming a thin layer of a resin obtained by polycondensation of at least one member selected from the class consisting of m-phenylene diamine, m-aminophenol, m-toluidine and aniline, and formaldehyde, on the surface of a membrane which has an insoluble infusible synthetic organic polymeric matrix and quaternary amine groups bonded chemically to the matrix, has a length of at least 1 cm. in two dimensions, is electrolytically conductive, and is anion selectively permeable.

It is well known to produce anion permselective membranes by casting a mixed solution consisting of aniline or m-phenylene diamine and formaldehyde on a plane surface and then resinifying it. However, these known anion permselective membranes are subject to cracking, their mechanical strength is small, and their selective permeability to anions is low. In addition, another important drawback is that their electric resistance is extremely high in a solution with high pH value due to their weak basicity, and so they are not suitable for use in a solution of high pH. Other methods to produce anion permselective membranes are known, in which a membrane of regenerated cellulose or a film of porous polyvinyl chloride is dipped first in an aqueous solution of m-phenylene diamine and then in an acidic formaldehyde solution. However, the anion permselective membranes obtained by these known methods mentioned immediately above cannot be practiced effectively, because their selective permeability to anions is low and it can not be increased without an increase of electrical resistance.

With regard to differences of permeability of anion permselective membranes due to the kind of anions, comparisons between $SO_4$ ion and organic acid ions and between Cl ion and amino acid anion, have been made, but no attempt has been made to alter positively the selective permeability among inorganic anions.

The present inventors have succeeded in obtaining anion permselective membranes which can be used in high pH solutions and which have great mechanical strength as well as high selective permeability to anions and particularly are more permeable to halogen ions among anions but which have extremely low permeability to ions of di- or higher valence, by forming and securing a thin layer of a condensation resin as described above on the surface of a base membrane of the said anion permselective type consisting of a strongly basic ion-exchange resin having quaternary amino groups.

The said condensation resin, which is secured to the surface of the base membrane, has high electric resistance but it has been discovered that even if the formed layer is so thin that electric resistance of the resulting membrane is low enough for practical use, the permeability of the said formed layer to polyvalent anions is considerably reduced. Since the mechanical strength of base membrane is not substantially affected by the film of the said condensation resin, it is possible to obtain a product with sufficiently great mechanical strength by adopting a suitable anion permselective membrane as a base membrane. In addition, because the selective permeability of the product to anions may be determined by that of the base membrane it is possible to obtain a product with high overall selective permeability to anions. The film of the resins coated on the surface of the base membrane as a thin layer has less tendency to cause cracks and even when the membrane cracks the surface of the base membrane is exposed only locally and accordingly, leakage of solution and cations does not occur and substantially no serious difficulty arises. There have never been known anion permselective membranes which can practically be used in high pH solutions, which have low electrical resistance and great mechanical strength, which have high selective permeability to anions, and which are more permeable to halogen ions than to divalent ions.

The anion permselective membrane composed of strongly basic anion-exchange resin, which is used as a base membrane in the present invention, is composed of an insoluble infusible synthetic organic polymeric matrix and dissociable quaternary amine groups bonded chemically thereto, has a length of at least 1 cm. in two dimensions, is electrolytically conductive and anion selectively permeable. It goes without saying that all the hitherto known anion permselective membranes consisting of strongly basic anion-exchange resins, can be used. For example, the so-called heterogeneous anion permselective membranes which are obtained by kneading crushed powder of a strongly basic anion-exchange resin with a synthetic resin as a binder, and then forming the resultant product into a membrane, or anion permselective membrane obtained by chloralkylating a cross-linked copolymer in a membrane form consisting of styrene and divinyl benzene or a cross-linked copolymer in a membrane form consisting of styrene and butadiene and thereafter aminating the chloralkylated product with a tertiary amine to introduce quaternary amine groups. In addition, an anion permselective membrane obtained by making a copolymer rubber of vinylpyridine and butadiene into a membrane form, vulcanizing the resultant product and then treating the vulcanized product with methyl iodide to quaternize the amine group can also be used. Furthermore, other well known anion permselective membranes having quarternary amine groups can be employed. The anion permselective membrane invented by the present inventors is one of the suitable base membranes. An anion permselective membrane which contains quaternary amine groups in its structure and which is produced by treating a membrane obtained by impregnating copolymer latex of styrene and butadiene in a reinforcing material such as glass cloth and drying, or by treating a membrane obtained by rolling a rubber-like copolymer of styrene and butadiene into a film, with a Friedel-Crafts reagent or by vulcanizing the membrane to convert it into an insoluble infusible state, chloralkylating the product and thereafter, aminating the resultant product with tertiary amine can also be used very effectively.

Various anion permselective membranes can be specified which are available on the market. These membranes have been found to have about 0.2–0.4 of $S_{Cl}^{SO_4}$ by measurement of the present inventors. In this invention, $S_{Cl}^{SO_4}$ expressed by the above-mentioned formula was measured in the following manner:

The solution used for measurement was an aqueous solution of 0.5 N NaCl and 0.05 N Na$_2$SO$_4$. The electrolytic cell consisted of an anode chamber, a cation permselective membrane, a diluting chamber, a cation permselective membrane, a concentrating chamber, an anion permselective membrane of the present invention to be tested, a solution chamber for taking measurements, an anion permselective membrane and a cathode chamber, in parallel arrangement in this order. When a known cation permselective membrane and anion permselective membrane are used, there is no limitation as to the kind thereof. In this invention, the base membrane described in Example 4 was used as the anion permselective membrane, and the cation permselective membrane used was that membrane which was obtained by treating a membrane of copolymer latex as described in Example 4 with 90% concentrated sulfuric acid at 30° C. for 3 hours and sulfonating the membrane and simultaneously converting the said copolymer into an insoluble infusible three dimensional network structure. The electrodes used were made of silver-silver chloride. Through both electrode chambers was passed 0.5 N NaCl solution, and 0.5 N NaCl solution was passed through the diluting chamber, and in the solution chamber a mixed solution of 0.5 N NaCl and 0.05 N Na$_2$SO$_4$ was passed at such a rate that the concentration did not change appreciably upon the passage of electric current. The concentrating chamber was provided with a stirrer. The measurement was made while keeping the temperature constant at 25° C. First, 0.5 N NaCl solution was introduced into the concentrating chamber and an electric current was passed at a current density of 2 amp./dm.$^2$ for about an hour, and after a steady state was reached, the solution in the concentrating chamber was withdrawn and then 0.5 N NaCl solution was introduced therein and the passage of current was continued for another 1–2 hours. Thereafter, the increases of Cl ion and SO$_4$ ion in the solution were measured. Cl ion was determined by the well-known precipitate-titration method using 0.1 N AgNO$_3$ solution and SO$_4$ ion by a gravimetric method in which BaSO$_4$ precipitated with BaCl$_2$ solution was weighed. The quantity of electricity passed during electrolysis was measured by means of an iodine coulometer connected in series to the electrolytic cell, and the transport numbers of each of the ions were calculated by the well-known method. In this case, the transport number of SO$_4$ ion through the cation permselective membrane used in pairs to construct the concentrating chamber could be neglected.

The transport numbers of Cl ion ($n_{Cl}$) and SO$_4$ ion ($n_{SO_4}$) which will be specified in the following as the measured values were obtained by the above-mentioned method, and $S_{Cl}^{SO_4}$ was calculated from these values by the formula as previously described. Further, $t_{SO_4}/t_{Cl}$ was 0.104, in which $t_{SO_4}$ and $t_{Cl}$ are respectively the transport number of SO$_4$ ion and Cl ion measured at 25° C. in a solution of N 0.5 NaCl and N 0.05 Na$_2$SO$_4$.

As described above, $S_{Cl}^{SO_4}$ of an anion permselective membrane consisting of a strongly basic anion-exchange resin is about 0.2–0.4, and an anion permselective membrane which has a still smaller value of $S_{Cl}^{SO_4}$ can be obtained by the followig treatment of the said membrane used as the base membrane. According to this invention a thin layer of a condensed resin consisting of at least one of m-phenylene diamine, m-aminophenol, m-toluidine and aniline, and formaldehyde, is formed and secured to the surface of the base membrane. The formation of the thin layer of the condensed resin can be carried out by the following procedure:

A mixed solution consisting of at least one of m-phenylene diamine, m-aminophenol, m-toluidine and aniline, and formaldehyde, or a solution of its partially polycondensed product is applied on the surface of the base membrane, or the said base membrane is dipped in these solutions, withdrawn and thereafter resinified completely. In the case where the components in the mixture are apt to react too rapidly with the formaldehyde, it is convenient that each of the components be applied separately on the surface of the base membrane or that the base membrane be dipped successively in these solutions, and thus coating on the surface of the base membrane is effected and then the coating is resinified completely. The application may be carried out by any known method such as brushing or spraying. Resinification, of course, may be accelerated by heating, but it usually proceeds rather rapidly and is completed without heating. In this invention, within the limits wherein the resinification is not inhibited and the value of said $S_{Cl}{}^{SO_4}$ can be kept in the desired range, it is possible to add a third component. For example, a quantity of ethylene diamine or diethyl triamine may be added. Further, it is possible to add carboxy methyl cellulose as an agent for increasing the viscosity of the solution. It should be noted that formaldehyde as used in the present invention includes such compounds as can easily generate formaldehyde, for example, paraformaldehyde. It goes without saying that any known catalysts such as sulfuric acid, hydrochloric acid and the like, can be used in the polycondensation reaction.

In order to decrease the permeability to polyvalent ions, it is enough that a thin layer of the said condensation products be formed on one side only of the surface of the base membrane, and accordingly this invention includes such cases. However, when the film is formed only on one side of the base membrane, the membrane is apt to warp in use due to the difference between the degree of swelling of the base membrane and that of the film formed on its surface, and therefore, it is advisable to form the film on both sides of the base membrane.

Regardless of the method used to form the film of the said polycondensed resins on the surface of the base membrane, it is an indispensable condition in this invention that on the surface of the base membrane a thin film consisting of the polycondensed resin be formed. Even with a thin film having a thickness of a few microns the purpose of this invention can be adequately attained; and if the film is removed and the surface of the base membrane is exposed, the desired effect decreases markedly regardless of the method used to form the film, and the desired end can not very well be attained. Thickness of the film of the polycondensed resin is difficult to measure precisely; but judging from the measured value of the increase in weight, the range from a few microns or less to 50 microns seems to be most suitable. However, if a small increase of electric resistance is tolerable, it is then possible to increase the thickness to about $100\mu$.

In order to enable those skilled in this art to practice the invention, the following illustrative examples are given.

Example 1

70 parts of copolymer rubber of styrene and butadiene (weight ratio 1:1) and 30 parts of polyethylene were mixed and kneaded together, and then the mixture was rolled by a calendar roll into film having a thickness of 0.15 mm. The membrane thus obtained was dipped in a solution which was prepared by dissolving 133 parts of $AlCl_3$ in a mixture of 74 parts of diethylether and 207 parts of dichloroethane and then saturating the resultant solution with hydrogen chloride gas, at 30° C. for 2 hours. After converting the copolymer rubber of the membrane into an insoluble infusible three dimensional network structure, the membrane was rinsed thoroughly with methanol and then air dried. The membrane thus treated was swelled in tetrachloroethane and thereafter, chloromethylated in a mixed solution consisting of 15 parts of chloromethylether, 3 parts of $SnCl_4$ and 82 parts of tetrachloroethane, at 30° C. for 3 hours, after which the chloromethylated membrane was rinsed with methanol, aminated by dipping in 0.5 N methanol solution of trimethylamine, and then rinsed with water and stored in ½ N NaCl solution. Effective resistance (R) of the membrane thus obtained was 4.2 $\Omega$-cm.$^2$, $n_{Cl}$ 0.96 and $S_{Cl}{}^{SO_4}$ 0.23, respectively.

After being withdrawn from the said NaCl solution, this membrane was rinsed with water and dried and then was dipped in a solution of m-phenylene diamine hydrochloride at 50° C. for 5 minutes, and thereafter, resinified by dipping in a mixed solution consisting of 50 parts of 36% Formalin and 5 parts of hydrochloric acid at 50° C., for 10 minutes. After being withdrawn, the membrane was heated at 80° C. for 1 hour, washed with water and then stored in ½ N NaCl solution. Effective resistance (R) of the membrane thus obtained was 7.4 $\Omega$-cm.$^2$, $n_{Cl}$ 0.97 and $S_{Cl}{}^{SO_4}$ 0.09, respectively.

Effective resistance as used in this example and the following examples means the value measured in a solution of 0.5 N NaCl and 0.05 N $Na_2SO_4$ at 25° C.

Example 2

A mixture of 100 parts of copolymer rubber consisting of methylvinylpyridine and butadiene (weight ratio 25:75), 100 parts of carbon black, 15 parts of sulphur, 3 parts of zinc oxide, 1.5 parts of dibenzothiazol disulfite, 1.5 part of stearic acid and 5 parts of chloranyl was kneaded together and the mixture was rolled into a sheet having a thickness of 0.3 mm. with roller. Then, this sheet was vulcanized by heating at 150° C. for 4 hours in a heating press and then treated with methyl iodide to convert the amine group contained in the structure to quaternary ammonium, and then rinsed successively with 1 N $Na_2SO_4$ and ½ N NaCl solutions. Effective resistance (R) of the membrane thus obtained was 4.5 $\Omega$-cm.$^2$, $n_{Cl}$ 0.97 and $S_{Cl}{}^{SO_4}$ 0.23, respectively.

This membrane was dried in air and after being daubed with an aqueous solution containing 30% of m-toluidine hydrochloride and 10% of carboxymethyl cellulose, dried for 2 minutes in air and thereafter was dipped in an acidic formaldehyde solution in the same way as in Example 1 for 10 minutes, rinsed with water and stored in ½ N NaCl solution. Effective resistance of the membrane thus obtained 6.2 $\Omega$-cm.$^2$, $n_{Cl}$ 0.97, and $S_{Cl}{}^{SO_4}$ 0.14, respectively.

Example 3

Effective resistance of another anion permselective membrane was 48.8 $\Omega$-cm.$^2$ and $S_{Cl}{}^{SO_4}$ was 0.40, respectively. This membrane was dipped in a 2.5% aqueous solution of m-phenylene diamine for 30 minutes, treated with acidic Formalin in the same way as in the preceding example, rinsed with water and stored in ½ N NaCl solution. Effective resistance of this membrane was 59.8 $\Omega$-cm.$^2$, and $S_{Cl}{}^{SO_4}$ was 0.21, respectively.

Example 4

Cloth of glass fiber of 0.07 mm. thickness was dipped in a styrene-butadiene copolymer rubber latex (bonded styrene 66% and total solid content 48%) and dried and this procedure was repeated three times. Weight ratio of rubber to glass fiber cloth after being thus treated was 40:60. In the same way as in Example 1, this membrane was treated with a solution obtained by dissolving $AlCl_3$ in a mixed solution of ethylether and dichloroethane and saturating with hydrochloric acid gas, chloromethylated and then aminated with trimethylamine. Effective resistance of the membrane thus obtained was 3.4 $\Omega$-cm.$^2$, $n_{Cl}$ 0.92 and $S_{Cl}{}^{SO_4}$ 0.24, respectively.

A mixture of 11 parts of m-phenylene diamine and 4 parts of concentrated hydrochloric acid was cooled to −20° C., and admixed well with 33 parts of 36% formalin at −20° C. The mixture was daubed on said dried membrane immediately and the membrane was dried at room temperature for 20 minutes, heated at 100° C. for 1 hour, and then stored in ½ N NaCl solution after rinsing with water. Effective resistance of the membrane thus obtained was 4.5 $\Omega$-cm.$^2$, $n_{Cl}$ 0.95 and $S_{Cl}{}^{SO_4}$ 0.10, respectively.

Example 5

A base membrane as in Example 4 was dipped in 30% aqueous solution of m-toluidine hydrochloride for 10 minutes and treated with acidic formalin in the same way as in Example 1. Effective resistance of the membrane thus obtained was 5.2 $\Omega$-cm.$^2$ and $S_{Cl}{}^{SO_4}$ 0.16, respectively.

Example 6

A base membrane as in Example 4 was daubed on its surface with aniline, dipped in 10% sulfuric acid containing 10% of formaldehyde at 50° C. for 10 minutes, rinsed with water, dried in air and then heated at 100° C. for 1 hour. Effective resistance of the membrane thus obtained was 7.8 Ω-cm.$^2$ and $S_{Cl}^{SO_4}$ 0.15, respectively.

*Example 7*

Effective resistance (R) of another anion permselective membrane was 9.4 Ω-cm.$^2$ and $S_{Cl}^{SO_4}$ 0.32, respectively.

This membrane was dipped in 5% aqueous solution of m-phenylene diamine for 30 minutes and then dipped in acidic formalin for 10 minutes in the same manner as in Example 6. Effective resistance (R) of the membrane thus obtained was 12.8 Ω-cm.$^2$, $n_{Cl}$ 0.95, and $S_{Cl}^{SO_4}$ 0.165, respectively.

In the above descriptions, only the permeability of Cl ion and SO$_4$ ion was described, but the membranes obtained by the methods in the present invention are generally much more permeable to other monovalent anions as well as halogen ions, as compared with di- or higher valent anions. However, monovalent ions might possibly bring about an opposite result in case they are large ions as, for example, ions of organic acids.

What we claim is:

1. An anion permselective membrane having specially low permeability to polyvalent anions comprising an electrically conductive and selectively anion-permeable base membrane which comprises an insoluble, infusible synthetic organic polymeric matrix and dissociable quaternary amine groups bonded chemically thereto, and a thin layer of condensed resin of formaldehyde and at least one member selected from the class consisting of m-phenylene diamine, m-aminophenol, m-toluidine and aniline.

2. A process for the production of anion permselective membranes having specially low permeability to polyvalent anions in comparison with halogenide ions, which comprises applying a thin layer of a solution of formaldehyde and a solution of at least one member selected from the class consisting of m-phenylene diamine, m-aminophenol, m-toluidine and aniline to the surface of an electrically conductive and selectively anion-permeable base membrane which comprises an insoluble, infusible synthetic organic polymeric matrix and dissociable quaternary amine groups bonded chemically thereto, by separately applying the said solutions to the surface of the said base membranes and then resinifying to make the said thin layer insoluble.

3. A process for the production of anion permselective membranes as defined in claim 2, in which said base membrane is successively dipped first in the solution of at least one member of the class consisting of m-phenylene diamine, m-aminophenol, m-toluidine and aniline, and then in the solution of formaldehyde.

4. A process for the production of anion permselective membranes having specially low permeability to polyvalent anions, which comprises forming a thin layer of a polycondensed resin of formaldehyde and at least one member selected from the class consisting of m-phenylene diamine, m-aminophenol, m-toluidine and aniline on the surface of a membrane which comprises an insoluble, infusible, synthetic organic polymeric matrix and dissociable quaternary amine groups bonded chemically to said matrix and which is electrically conductive and anion selectively permeable.

5. A process for the production of anion permselective membranes having specially low permeability to polyvalent anions in comparison with halogenide ions, which comprises forming a thin layer of a solution of formaldehyde and at least one member selected from the class consisting of m-phenylene diamine, m-aminophenol, m-toluidine and aniline on the surface of an electrically conductive and selectively anion-permeable base membrane which comprises an insoluble, infusible synthetic organic polymeric matrix and a dissociable quaternary amine group bonded chemically thereto, by applying the said solution to the surface of the said base membrane and then resinifying the thin layer thus produced.

6. A process for the production of anion permselective membranes as defined in claim 5, in which said base membranes are dipped in a solution of formaldehyde and at least one member selected from the class consisting of m-phenylene diamine, m-aminophenol, m-toluidine and aniline.

References Cited by the Examiner

UNITED STATES PATENTS 2,977,298   3/1961   Cooke et al. _____ 204—296

FOREIGN PATENTS 793,212   4/1958   Great Britain.

JOHN H. MACK, *Primary Examiner.*

D. R. JORDAN, *Assistant Examiner.*